United States Patent
Dunn et al.

(10) Patent No.: US 9,880,981 B2
(45) Date of Patent: Jan. 30, 2018

(54) AUTOMATICALLY DETECTING THE ABILITY TO EXECUTE PROCESSING LOGIC AFTER A PARSER OR VALIDATION ERROR

(75) Inventors: Tim Dunn, Warnford (GB); Oliver Wynn, Leeds (GB)

(73) Assignee: International Business Machines Corporation, Armonk, NY (US)

(*) Notice: Subject to any disclaimer, the term of this patent is extended or adjusted under 35 U.S.C. 154(b) by 924 days.

(21) Appl. No.: 12/982,639

(22) Filed: Dec. 30, 2010

(65) Prior Publication Data

US 2012/0173492 A1 Jul. 5, 2012

(51) Int. Cl.
*G06F 17/00* (2006.01)
*G06F 17/22* (2006.01)
*G06F 17/27* (2006.01)

(52) U.S. Cl.
CPC ...... *G06F 17/2247* (2013.01); *G06F 17/2725* (2013.01)

(58) Field of Classification Search
None
See application file for complete search history.

(56) References Cited

U.S. PATENT DOCUMENTS

| | | | |
|---|---|---|---|
| 8,078,961 B2* | 12/2011 | Vion-Dury | G06F 17/2247 715/234 |
| 2002/0038320 A1* | 3/2002 | Brook | 707/513 |
| 2004/0107025 A1* | 6/2004 | Ransom et al. | 700/286 |
| 2004/0138787 A1* | 7/2004 | Ransom et al. | 700/295 |
| 2004/0226002 A1* | 11/2004 | Larcheveque | G06F 17/2247 717/126 |
| 2006/0059165 A1* | 3/2006 | Bosloy et al. | 707/10 |
| 2007/0100920 A1* | 5/2007 | Funnekotter et al. | 708/233 |
| 2008/0320031 A1* | 12/2008 | Denoual | G06F 17/2247 |
| 2009/0044103 A1* | 2/2009 | Chalecki | G06F 17/2247 715/234 |
| 2009/0089658 A1* | 4/2009 | Chiu et al. | 715/234 |
| 2010/0057851 A1* | 3/2010 | Ionescu et al. | 709/204 |
| 2010/0069035 A1* | 3/2010 | Johnson | 455/404.1 |
| 2011/0088011 A1* | 4/2011 | Ouali | 717/105 |

* cited by examiner

*Primary Examiner* — Dung K Chau
(74) *Attorney, Agent, or Firm* — Steven M. Greenberg, Esq.; CRGO Law

(57) ABSTRACT

In an embodiment of the invention, a method for error handling during document processing is provided. The method includes receiving a well-defined document as input to a computer program executing in memory of a computer, parsing the well-defined document and validating the well-defined document as conforming with a defined plan for the well-defined document, and responsive to detecting an error during parsing and validating, permitting use of the well-defined document to proceed notwithstanding the detected error if enough of the well-defined document conforms to the defined plan to satisfy programmatic input needs of the computer program, but otherwise terminating use of the well-defined document in the computer program.

12 Claims, 3 Drawing Sheets

AUTOMATICALLY DETECTING THE ABILITY TO EXECUTE PROCESSING LOGIC AFTER A PARSER OR VALIDATION ERROR

BACKGROUND OF THE INVENTION

Field of the Invention

The present invention relates to document processing and more particularly to error handling during document processing.

Description of the Related Art

A markup language is a modern system for annotating a text in a way that is syntactically distinguishable from that text. The idea and terminology evolved from the "marking up" of manuscripts, namely the revision instructions by editors; traditionally written with a blue pencil on the manuscripts of authors. The concept of markup continued through early forms of the word processor in which presentation and formatting instructions for text can indicate the text upon which the instructions were to be applied by tagging a start and finish position in the text to denote the target text. The concept of presentation markup continued in the context of content distribution and most notably with the widespread use of the hypertext markup language (HTML).

In HTML, content is structured for presentation according to tags embedded in the contact directing the manner in which the tagged content is to be presented. Advanced forms of HTML provide support for embedded programmatic logic and the referencing of embedded scripts or external executable or interpretable instructions. Of import, HTML has a set of predefined presentation semantics, meaning their specification prescribes how the structured data is to be presented. Other markup languages, like the extensible markup language (XML), have no predefined semantics and often require a plan or schema setting forth a permissible structure for the document.

The XML specification defines an XML document as a text which is—that is, it satisfies a list of syntax rules provided in the XML specification. The definition of an XML document excludes text which contains violations of the "well-formedness rules." An XML processor encountering such a violation is required to report such errors and to cease normal processing. This policy, occasionally referred to as draconian, stands in notable contrast to the behavior of programs which process HTML, which are designed to produce a reasonable result even in the presence of severe markup errors.

In addition to being well-formed, an XML document must be valid. In this regard, the XML document must contain a reference to schema or grammar, typically embodied within a Document Type Definition (DTD), and the elements and attributes of the XML document must be declared in that DTD and follow the grammatical rules for the elements and attributes that the DTD specifies. As such, XML processors are classified as validating or non-validating depending on whether or not the XML processors check XML documents for validity. A processor which discovers a validity error must be able to report it, but may continue normal processing.

An XML document must be parsed into a usable format for other programs to use. But during processing, the document may fail to be parsed correctly; or, alternatively, parsing may be completed, but fail validation against a schema or data format definition. In either case, full processing of the well-formed document cannot continue without problems as portions of the incoming data will be missing or incomplete. Although there may, in theory, be enough data to continue processing in a limited way through certain paths of application logic, there is no way to determine if there is sufficient data to successfully traverse a path of application logic. In other words, there is no process that allows the parsing of a well-formed document to continue even in a restrictive way.

BRIEF SUMMARY OF THE INVENTION

Embodiments of the present invention address deficiencies of the art in respect to document processing and provide a novel and non-obvious method, system and computer program product for error handling during well-defined (well-formed) document processing. In an embodiment of the invention, a method for error handling during well-defined document processing is provided and includes receiving a well-defined document as input to a computer program executing in memory of a computer, parsing the well-defined document and validating the parsed data as conforming with a defined plan such as a schema for the well-defined document, and responsive to detecting an error during parsing and validating, permitting use of the well-defined document to proceed notwithstanding the detected error if enough of the well-defined document conforms to the defined plan to satisfy programmatic input needs of the computer program, but otherwise terminating use of the well-defined document in the computer program.

Another embodiment of the invention provides a document processing system for error handling during document processing. The system can include a computer configured to support a computer program, a parser, a document validator, and an error handling module. The error handling module can include program code for receiving a well-defined document as input in a computer program executing in memory of a computer, parsing the document and validating the well-defined document as conforming with a defined plan for the well-defined document, and responsive to detecting an error during parsing and validating, permitting use of the well-defined document to proceed notwithstanding the detected error if enough of the well-defined document conforms to the defined plan to satisfy programmatic input needs of the computer program, but otherwise terminating use of the well-defined document in the computer program.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In accordance with an embodiment of the invention, an expected well-formed document can be received as input to a computer program in a document processing system. In the course of parsing the document and validating the document as conforming to a defined plan or schema, an error can be encountered. Instead of terminating processing of the well-defined document in response to the detected error, the system determines if enough of the well-defined document conforms to the defined plan or schema to satisfy programmatic input needs of the computer program to proceed with processing. In this way, the processing of the well-defined document can continue, albeit in a restrictive manner.

Figure 1:
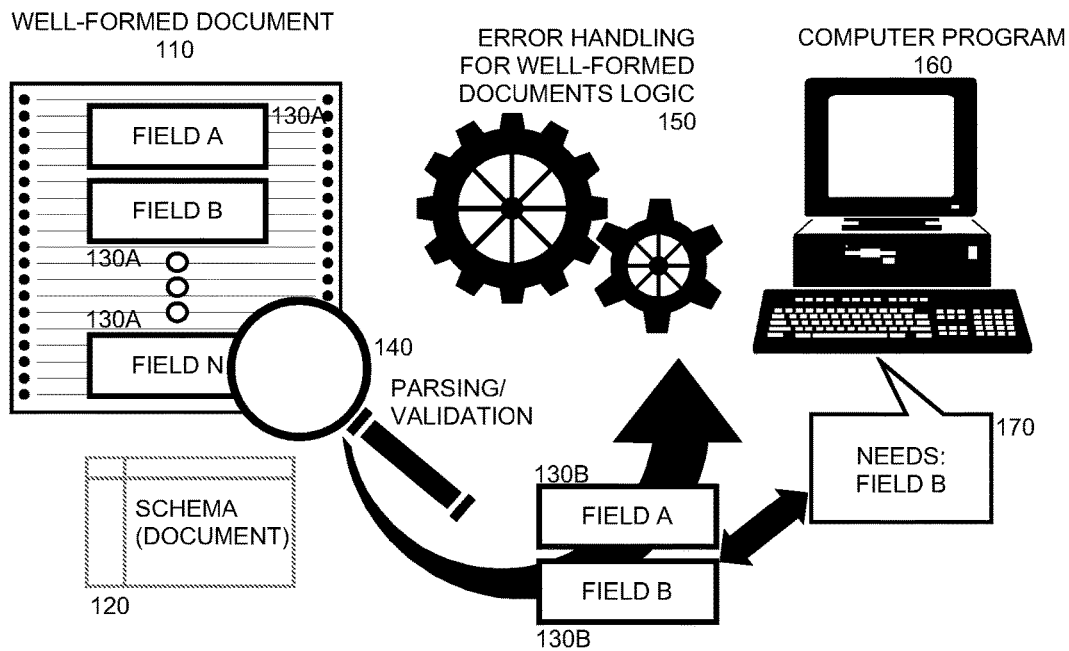
FIG. 1 is a pictorial illustration of a process for error handling during document processing.

In further illustration, FIG. 1 pictorially shows a process for error handling during document processing. As shown in FIG. 1, a well-defined (well-formed) document 110 comprised of different fields 130A, such as an XML document or any XML compliant document, can be provided as input to a computer program 160 for document processing 140, including parsing by a document parser and/or validation by a document validator. The validator during processing 140 will consider the well-defined document 110 as valid if the well-defined document 110 contains references to a schema 120 (document grammar such as a DTD) and if the elements and attributes declared in the schema 120 follow the grammatical rules for the elements and attributes that the schema 120 specifies. Of note, the well-defined document 110 can be a message formatted for use by a message broker in which case the computer program 160 can be a message broker.

During processing 140 of the well-defined document 110, an error can be detected. Upon detecting an error, the error handling for well-defined documents logic 150 can determine whether or not parsing and/or validation during processing 140 of the well-defined document 110 can proceed notwithstanding the detected error. Specifically, the error handling for well-defined documents logic 150 can determine whether or not any of the fields 130A of the well-defined document 110 conforms to the defined schema 120 so as to satisfy the programmatic input needs 170 of the computer program 160. In particular, if the programmatic input needs 170 of the computer program require successful parsing and validation of only a subset 130B of the fields 130A, then processing of the well-defined document 110 can proceed notwithstanding the detected error. Otherwise, if the programmatic input needs 170 cannot be satisfied by the successful parsing and validation of the subset 130B of the fields 130A, the error handling for well-defined documents logic 150 can terminate use of the well-defined document 110 in the computer program 160, thus, terminating processing 140 of the well-defined document 110.

Figure 2:
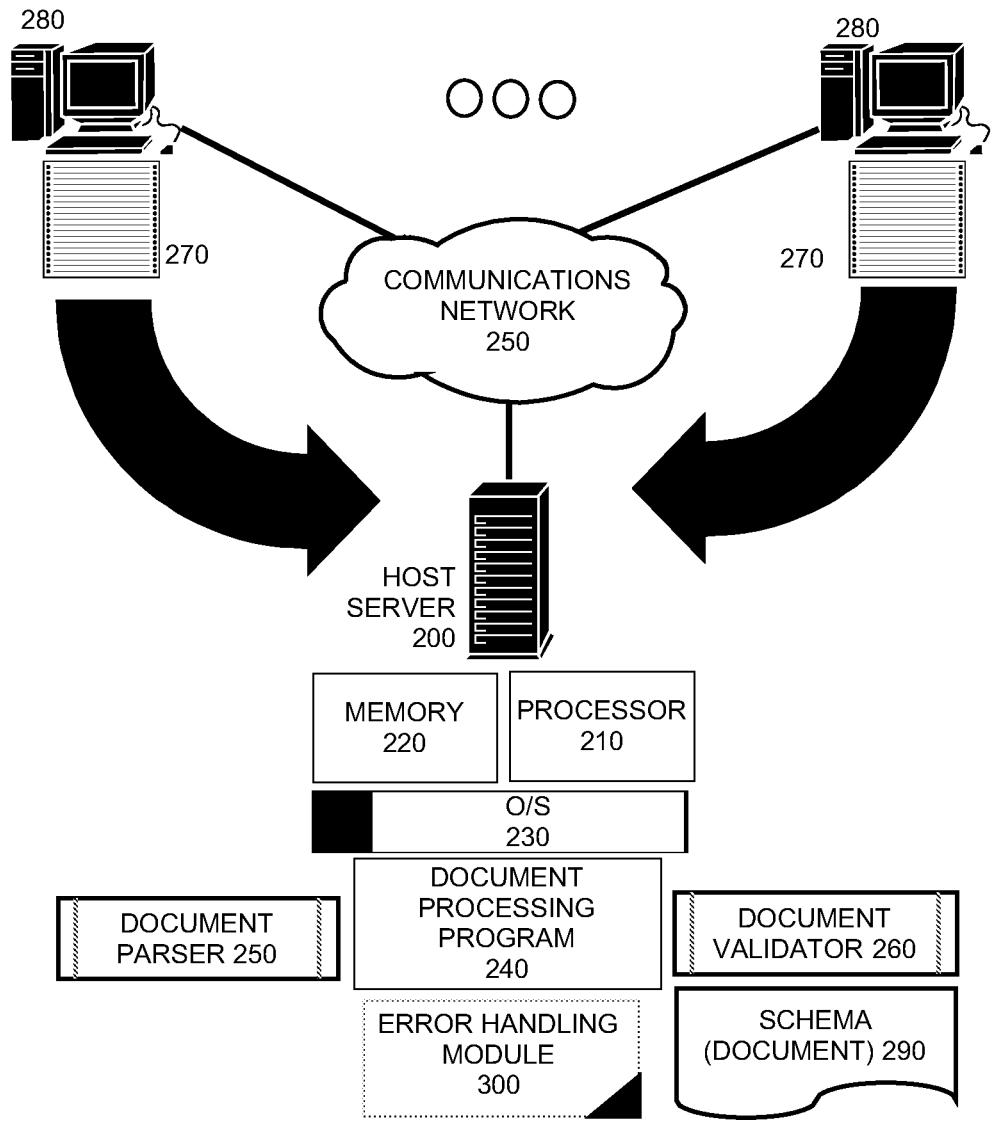
FIG. 2 is a schematic illustration of a document processing system configured for error handling during document processing; and, FIG. 3 is a flow chart illustrating a process for error handling during document processing.

The process described in connection with FIG. 1 can be implemented in a document data processing system. In further illustration, FIG. 2 schematically shows a document data processing system configured for error handling during document processing. The system can include a host server 200 including at least one processor 210 and memory 220. The host server 220 can support the execution of an operating system (O/S) 230 and the O/S 230 in turn can host the operation of a computer program such as a document processing program 240.

The document processing program 240 can be configured for processing a well-defined document 270 over a global computer communications network 250 such as the Internet, and managing access thereto by different computing devices 280. For example, the document processing program 240 can be a message broker processing messages in the form of a well-formatted document 270. The document processing program 240 can be coupled to a document parser 260A and a document validator 260B. The document parser 260A can be configured to parse the well-defined document 270 upon receiving the well-defined document 270, and the document validator 260B can be configured to validate the parsed data received from the document parser 260A, according to a schema 290 for the well-defined document 270.

Of note, an error handling module 300 can execute in the memory 220 of the host server 200 and can be coupled to the document processing program 240. The error handling module 300 can include program code, which when executed by at least one processor 210 of the host server 200, can determine whether or not to permit the document processing program 240 to proceed in processing a received well-defined document 270 notwithstanding detecting an error during the pre-processing of the well-defined document 270—namely during parsing by the document parser 260A and validation according to a schema 290 by the document validator 260B.

Specifically, once an error has been detected by the document parser 260A or the document validator 260B, the program code can be further enabled to determine whether or not enough of the well-defined document 270 conforms to a corresponding defined schema 290 to satisfy programmatic input needs of the document processing program 240. Upon a determination that the well-defined document 270 satisfies the programmatic input needs of the document processing program 240, the program code can be enabled to permit processing of the well-defined document 270 to proceed. The program code can be further enabled to terminate use of the well-defined document 270, upon a determination that the well-defined document 270 does not satisfy the programmatic input needs of the document processing program 240.

Figure 3:
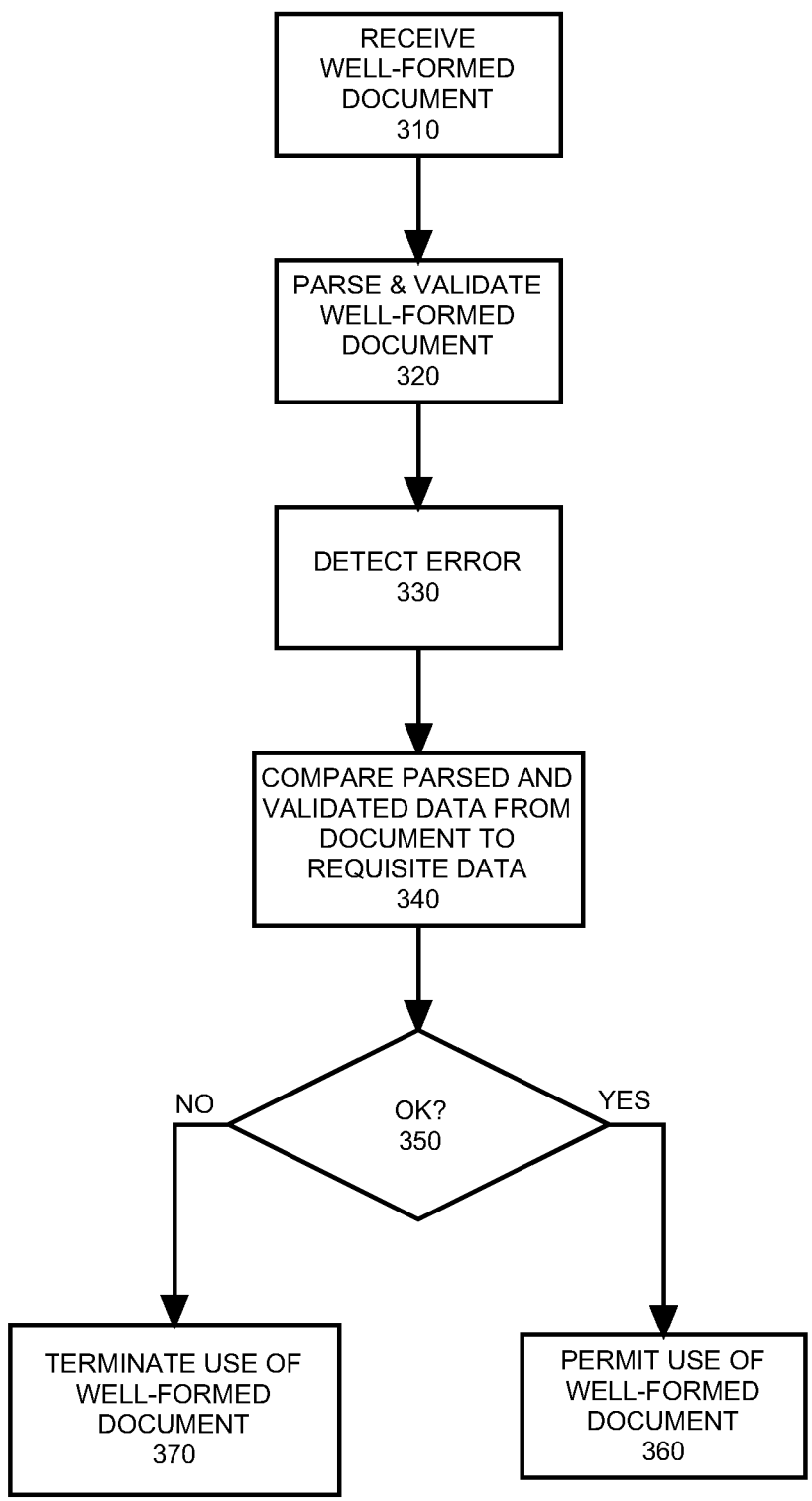

In even yet further illustration of the operation of the program code of the error handling module 300, FIG. 3 is a flow chart illustrating a process for error handling during document processing. Beginning in block 310, a well-defined document can be received from a computing device over the Internet or any communications network through a document processing program. In block 320, the well-defined document can be parsed and validated. An error can be detected, during parsing or validation of the well-defined document, as shown in block 330. In response to the detected error, in block 340 the parsed and validated data from the well-defined document can be compared to data requisite to the operation of the document processing program. For instance, source code directives or markup language directives of the document processing program can be inspected in a call path of execution to determine specific fields of data in the well-defined document that are expected as input.

In decision block 350, it can be determined whether or not enough of the well-defined document (for instance, the specific fields of data in the well-defined document that are expected as input) conforms to a corresponding defined schema to satisfy the programmatic input needs of the document processing program. If enough of the well-defined document conforms, processing (parsing and/or validation) of the well-defined document can be permitted to continue, as in block 360. Otherwise, if not enough of the well-defined document conforms, processing of the well-defined document by the document processing program can be terminated, as in block 370.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An error recovery method for processing well-defined documents comprising:
   executing a document processing program in memory by a processor of a computer;
   receiving a well-defined document as input to the document processing computer program, the document comprising a multiplicity of different fields;
   parsing the well-defined document and validating the well-defined document as conforming with a defined plan for the well-defined document; and,
   on condition that an error is detected during the parsing and the validating, further determining if enough of the well-defined document conforms to the defined plan in so far as the programmatic input needs of the document processing computer program require successful parsing and validation of only a subset of the fields, and on condition that enough of the well-defined document conforms to the defined plan in that ones of the fields required as programmatic input for the document processing computer program are determined to be successfully parsed and validated in the document and ones of the fields of the document determined not to be successfully parsed and validated also are determined not to be required as programmatic input for the document processing computer program, processing the well-defined document in the document processing computer program notwithstanding the detected error, but otherwise terminating use of the well-defined document in the document processing computer program.

2. The method of claim 1, wherein the well-defined document is an extensible markup language (XML) compliant document and the defined plan is set forth in a document type definition (DTD).

3. The method of claim 1, wherein the well-defined document is a message and the computer program is a message broker.

4. The method of claim 1, wherein the programmatic input needs of the computer program comprises data in a selected set of fields but not all of the fields of the well-defined document.

5. A computer program product for error handling during document processing, the computer program product comprising:
   a computer readable storage medium having computer readable program code embodied therewith, wherein the computer readable storage medium is not a transitory signal per se, the computer readable program code comprising:
   computer readable program code for executing a document processing program in memory by a processor of a computer;
   computer readable program code for receiving a well-defined document as input to the document processing computer program, the document comprising a multiplicity of different fields;
   computer readable program code for parsing the well-defined document and validating the well-defined document as conforming with a defined plan for the well-defined document; and,
   computer readable program code for, on condition that an error is detected during the parsing and the validating, further determining if enough of the well-defined document conforms to the defined plan in so far as the programmatic input needs of the document processing computer program require successful parsing and validation of only a subset of the fields, and on condition that enough of the well-defined document conforms to the defined plan in that ones of the fields required as programmatic input for the document processing computer program are determined to be successfully parsed and validated in the document and ones of the fields of the document determined not to be successfully parsed and validated also are determined not to be required as programmatic input for the document processing computer program, processing the well-defined document in the document processing computer program notwithstanding the detected error, but otherwise terminating use of the well-defined document in the document processing computer program.

6. The computer program product of claim 5, wherein the well-defined document is an extensible markup language (XML) compliant document and the defined schema is set forth in a document type definition (DTD).

7. The computer program product of claim 5, wherein the well-defined document is a message and the computer program is a message broker.

8. The computer program product of claim 5, wherein the programmatic input needs of the computer program comprises data in a selected set of fields but not all of the fields of the well-defined document.

9. A document processing system configured for error handling during document processing comprising:
   a computer with at least one processor and memory;
   a document processing computer program executing on the computer;
   a parser and document validator coupled to the document processing computer program, the parser parsing data in a received well-defined document, the document comprising a multiplicity of different fields, the validator validating the parsed data according to a plan for the well-defined document; and,
   an error handling module coupled to the document processing computer program, the module comprising program code enabled to detect an error during parsing and validation by the parser and validator of a received well-defined document, and on condition that an error is detected, to further determine if enough of the well-defined document conforms to the defined plan in so far as the programmatic input needs of the document processing computer program require successful parsing and validation of only a subset of the fields, and on condition that enough of the well-defined document conforms to the defined plan in that ones of the fields required as programmatic input for the document processing computer program are determined to be successfully parsed and validated in the document and ones of the fields of the document determined not to be successfully parsed and validated also are determined not to be required as programmatic input for the document processing computer program, to process by the document processing computer program the well-defined document notwithstanding the detected error, but otherwise to terminate use of the well-defined document in the document processing computer program.

10. The system of claim 9, wherein the well-defined document is an extensible markup language (XML) compliant document and the defined plan is set forth in a document type definition (DTD).

11. The system of claim 9, wherein the well-defined document is a message and the computer program is a message broker.

12. The system of claim 9, wherein the programmatic input needs of the computer program comprises data in a selected set of fields but not all of the fields of the well-defined document.

* * * * *